No. 791,345. PATENTED MAY 30, 1905.
O. F. KADOW.
TIRE REPAIRING DEVICE.
APPLICATION FILED AUG. 22, 1904.

WITNESSES:
INVENTOR.
Otto F. Kadow
BY Fouts & Hull,
ATTYS.

No. 791,345. Patented May 30, 1905.

UNITED STATES PATENT OFFICE.

OTTO F. KADOW, OF CLEVELAND, OHIO.

TIRE-REPAIRING DEVICE.

SPECIFICATION forming part of Letters Patent No. 791,345, dated May 30, 1905.

Application filed August 22, 1904. Serial No. 221,640.

*To all whom it may concern:*

Be it known that I, OTTO F. KADOW, residing at Cleveland, in the county of Cuyahoga and State of Ohio, have invented a certain new and useful Improvement in Tire-Repairing Devices, of which the following is a full, clear, and exact description, reference being had to the accompanying drawings.

My invention relates to repair devices for sectional pneumatic tires, and has for its object the construction of a member or shoe that may be readily applied to the rim of the vehicle carrying the tire and that will effectively bridge the gap caused by puncturing a section of the tire and temporarily take the place of such section, enabling the vehicle to be taken to a place where permanent repairs may be made.

Generally speaking, the invention may be defined as consisting of the combinations of elements embodied in the claims hereto annexed.

Figure 3:
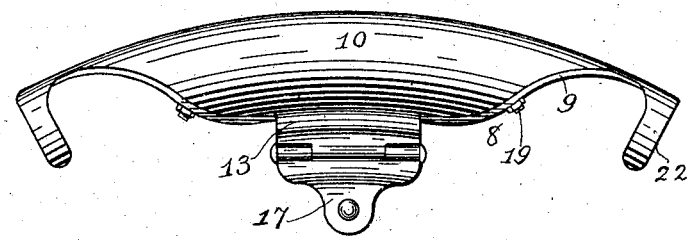
Figure 2:
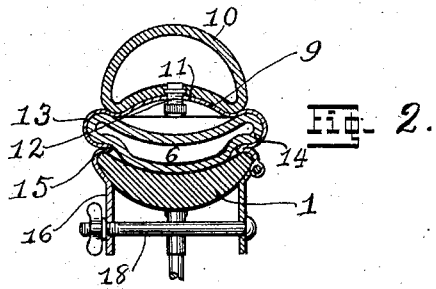
Figure 1:
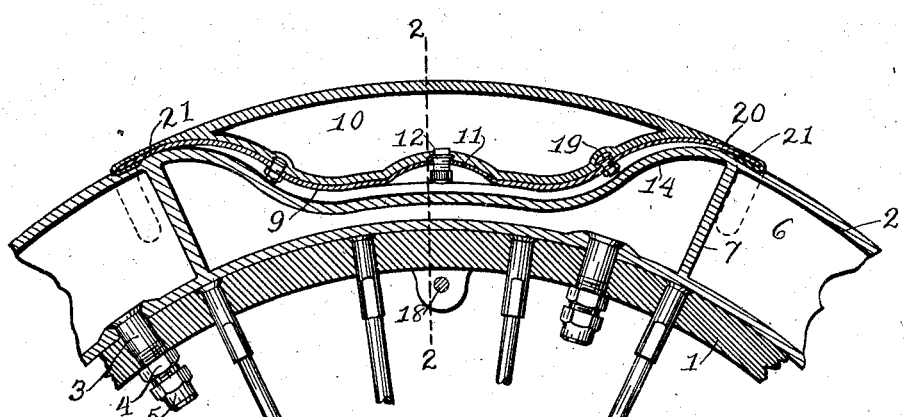
Figure 4:

Referring to the drawings, Figure 1 represents a longitudinal section of my device and so much of a tire and rim as is necessary to show the manner of its application thereto. Fig. 2 represents a transverse section on the line 2 2 of Fig. 1. Fig. 3 represents a side elevation of my device, and Fig. 4 represents a detail view of one of the end clips of said device.

Describing the parts by numerals, 1 represents the rim of a vehicle, having a tire 2 attached thereto, as by means of bolts 3 and nuts 4. These bolts may be hollow, if desired, for inflating the tire-sections and may each be provided with a cap 5. The tire is made up of a number of sections 6, separated by partitions 7 of sufficient strength to avoid rupture should an adjacent section be deflated, as by puncture. With a tire of this character I employ a repair member or shoe 8, said member consisting, preferably, of two parts— a base-plate or support 9 and a cushion 10. The base-plate, with the parts in the position shown in the drawings, is bent downwardly and is provided with a central elevation 11, providing a recess within which an inflating connection 12 (if the cushion be pneumatic) may be located. For a considerable portion of the length intermediate the ends the support is bent or curved outwardly at its sides at 13 and is then bent inwardly to form inwardly-extending shoulders 15, which engage the outer surface of the rim. The outwardly-curved portions 13 receive the deflated tire-section 14 and give resiliency to the support for the cushion.

16 and 17 designate extensions depending from the shoulders 15, and 18 designates a bolt by means of which said extensions may be drawn together and the shoe securely clamped to the rim. For convenience of application one of said extensions, as 17, is hinged.

The cushion 10 is suitably secured to the support 9, as by short bolts 19. When the shoe is in place and the cushion inflated, the outer surface of the cushion constitutes, in effect, a portion of the tire, the ends 20 of the cushion and 21 of the support extending onto and bearing upon the surfaces of the adjacent sections 6. For securing a proper bearing of said ends on such sections and to assist in retaining the shoe in place the ends of the support and of the cushion are formed into clips 22, which are a little more than a semicircle in extent, enabling them to firmly and partially embrace the sections adjacent the deflated section. The ends of the cushion are drawn over the ends of the plate, as shown, being secured thereto in any suitable manner, as by cementing or vulcanizing.

With a shoe or repair member of the character hereinbefore described I am enabled to employ therewith a tire having but a few sections, thereby materially decreasing the expense of constructing the same over tires having partitions so close together as to prevent the rim from striking in the event of a puncture. Should one of the sections of my tire become punctured or otherwise deflated, it will be necessary only to apply my shoe in the manner indicated in the drawings to permit the vehicle to reach a place where permanent repairs may be conveniently made.

It will be obvious that the embodiment of my invention hereinbefore described may be altered without violating the spirit of my invention. For instance, a single curved member, as a metallic plate, might be substituted for the compound member or shoe herein disclosed or a solid cushion might be substituted for the pneumatic cushion without sacrificing many of the advantages incidental to my construction, and though I have necessarily described my invention in detail I do not propose to be limited to such details, except as the same may be included in the claims hereto annexed or rendered necessary by the prior state of the art.

Having described my invention, what I claim as new, and desire to secure by Letters Patent, is—

1. A pneumatic tire having its air-containing tube divided into independent sections, combined with a shoe or repair member of greater length than an individual section, and means for securing said shoe or member in place over one of said sections of the tire.

2. A pneumatic tire having its air-containing tube divided into independent sections, combined with a curved shoe or repair member of greater length than an individual section and having ends adapted to bear upon the adjacent sections, and means for securing said shoe or member in place.

3. A pneumatic tire having its air-containing tube divided into independent sections, combined with a curved member or shoe of greater length than an individual section and having ends adapted to rest upon and partially embrace the adjacent sections of the tire, and means for securing said shoe or member in place.

4. A pneumatic tire having its air-containing tube divided into independent sections, combined with a curved repair member or shoe of greater length than an individual section and having at each end a clip adapted to partially embrace an adjacent section, and means for securing said shoe or member in place.

5. A pneumatic tire having its air-containing tube divided into independent sections, combined with a repair member or shoe of greater length than an individual section and having a portion adapted to engage the outer surface of the rim, and means for securing said member or shoe in place.

6. A pneumatic tire having its air-containing tube divided into independent sections, combined with a repair member or shoe of greater length than an individual section and having end portions adapted to engage the outer surfaces of the adjacent sections and an intermediate portion adapted to engage the outer surface of the rim, and means for clamping said member or shoe in place.

7. A pneumatic tire having its air-containing tube divided into independent sections, combined with a repair member or shoe of greater length than an individual section and having at each end a curved clip adapted to partially surround the adjacent tire-sections and an intermediate portion adapted to engage the outer surface of the rim, and depending portions for clamping the shoe to the rim.

8. A repair member or shoe for sectional tires, said member or shoe comprising a pneumatic cushion adapted to be fitted in operative relation to a collapsed section, and means for securing said cushion in place.

9. A repair member or shoe for sectional tires, said member or shoe comprising a pneumatic outer cushion and a support for said cushion, and means for securing said cushion and support in operative relation to a collapsed section of the tire.

10. A repair member or shoe for sectional tires, said member comprising a cushion provided with ends adapted to extend beyond the ends of a collapsed section and to bear upon the surfaces of the adjacent sections, a metallic support for said cushion having ends complementary to the ends of the cushion, and means for securing said cushion and support in place.

11. A repair member or shoe for sectional tires, said member comprising a metallic support of greater length than a section of the tire and having its ends formed into curved clips adapted to engage the tire, means for securing said support in place, and a cushion carried by said support having ends extending beyond the ends of the support and turned under said clips.

12. A repair member or shoe for sectional tires, said member comprising a downwardly-curved plate having ends adapted to extend beyond the ends of a collapsed section and bear against the surfaces of the adjacent sections, a cushion secured to said plate, said plate having outwardly-extending side portions for receiving the collapsed section of the tire and inwardly-extending shoulders adapted to engage the sides of the rim, and means for securing said plate to the rim.

13. A repair member or shoe for sectional tires, said member comprising a downwardly-curved base-plate having a central elevated portion, a pneumatic cushion secured to said plate and having an inflating-tube extending through the elevated portion of the plate, said plate having outwardly-extending side portions for the reception of the collapsed section, and means for securing said plate to the rim.

14. A repair member or shoe for sectional tires, said member having a curved surface of greater length than a section of the tire, outwardly-projecting side portions for the reception of the deflated tire-section, inwardly-projecting shoulders below said side portions adapted to engage the outer surface of the rim, and means for securing said member in place.

15. A repair member or shoe for sectional tires, said member having a curved surface of greater length than a section of the tire, outwardly-projecting side portions for the reception of the deflated tire-section, inwardly-projecting shoulders below said side portions adapted to engage the outer surface of the rim, and clamping members depending from said shoulders for securing the shoe to the rim.

16. A pneumatic tire having its air-containing tube divided into independent sections, combined with a shoe or repair member having an outer curved surface adapted to form in effect a portion of the outer surface of the tire and means for applying said member to a deflated section of the tire.

17. A repair member or shoe for sectional tires, said member or shoe comprising a cushion of greater length than an individual section and provided with ends adapted to engage the surfaces of the adjacent sections, and means for supporting said cushion in operative relation to a collapsed section of the tire.

18. A repair member or shoe for sectional tires, said member or shoe comprising a cushion of sufficient length to fill the space between adjacent partitions and having an outer curved surface corresponding to the curvature of the tire, and means for supporting said cushion in operative relation to a collapsed section of the tire.

In testimony whereof I affix my signature in the presence of two witnesses.

OTTO F. KADOW.

Witnesses:
L. M. SCHOOF,
MILDRED BACH.